Aug. 7, 1934.     C. C. CADDEN ET AL     1,969,203
HOSE COUPLING AND METHOD OF MAKING THE SAME
Filed June 14, 1932
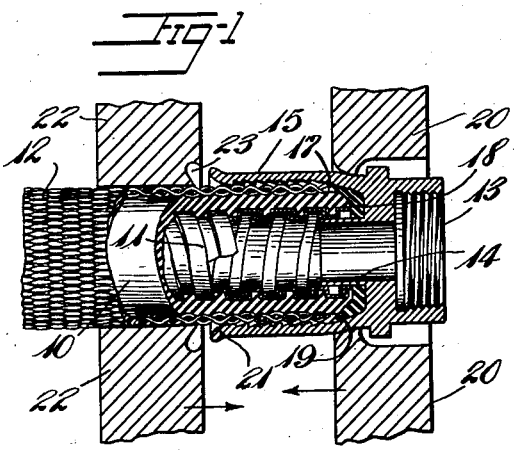
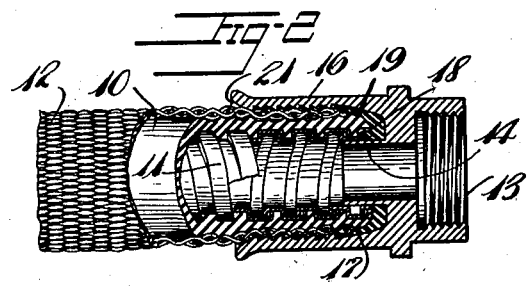
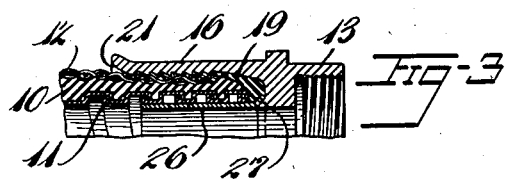
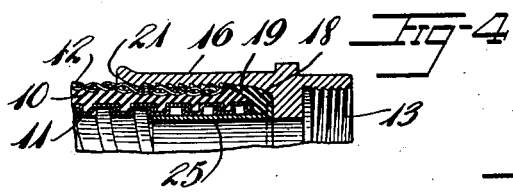
Inventors
Charles C. Cadden
Harry A. Bourne
By Eakin & Avery
Attys.

Patented Aug. 7, 1934

1,969,203

UNITED STATES PATENT OFFICE 1,969,203

HOSE COUPLING AND METHOD OF MAKING THE SAME

Charles C. Cadden and Harry A. Bourne, Akron, Ohio, assignors to The B. F. Goodrich Company, New York, N. Y., a corporation of New York Application June 14, 1932, Serial No. 617,124

15 Claims. (Cl. 29—148.2)

This invention relates to hose couplings and to methods of making the same, and especially to the manufacture of couplings for hose used for such fluids as gasoline and other hazardous liquids where fluid-tightness and ruggedness are of especial importance.

Prior coupling constructions have not in all cases provided the desired high degree of assurance against leakage of the fluid past the hose end, and where adequate fluid tightness has been provided, the construction has often been undesirably complex and uneconomical, it having been difficult to provide the two characteristics of adequate fluid tightness and simplicity of construction in the same structure. The difficulty of providing satisfactory fluid-tightness has been present especially with hose having a cover of fibrous fabric material, the end of which has often been crowded in the coupling to a position of vulnerability so that the fluid finding its way to the end of the cover through crevices in the inner coupling wall or hose surface has been caused to leak along the cover by the action of capillarity. Expedients involving the use of a sealing ring or washer have been used, but the prior constructions have been such that crowding of the end of the hose cover to a vulnerable position of accessibility to the fluid has not always been avoided, and the prior constructions have in many cases been subject to the objection that the annular zone at the hose end between the fluid and the end of the hose cover has had an inadequate seal, with respect to both sealing pressure and width of the sealing zone.

The chief objects of this invention are to provide with economy and simplicity of structure and procedure an improved coupling, and to provide a coupling and procedure for making the same in which the above discussed difficulties are to a large extent avoided.

These and further objects will be apparent from the following description, reference being had to the drawing, in which:

Fig. 1 is an elevation, partly broken away and sectioned, of assembling tools and associated therewith a hose end and a coupling at an intermediate stage in the procedure of assembling the hose and coupling according to a preferred form of the invention.

Fig. 2 is a view similar to that of Fig. 1 but showing the coupling and hose end finally assembled.

Figs. 3 and 4 are longitudinal sections, partly broken away, of finally assembled couplings and hose ends, showing modified constructions.

Referring to the drawing, the hose illustrated is of a type commonly used in connection with service fuel pumps and comprises a rubber body 10, an inner, flexible, metallic liner 11, and an outer, woven fabric cover 12.

The coupling of Fig. 1 comprises a body portion 13 having an inner nipple 14 and an outer sleeve 15 integral with the body and defining between them an annular chamber for accommodating the hose end.

For holding the hose end in locking and sealing relation to the coupling, the hose body 10 and cover 12 are held compressed between the outer sleeve of the coupling and the metallic liner 11 of the hose by a reduction in diameter of the sleeve from the preliminary enlarged size shown at 15 in Fig. 1 to the final reduced size shown at 16 in Fig. 2.

Preparatory to the assembly operation, the end portion of the hose cover 12 preferably is removed so that the cover terminates short of the hose end, as shown at 17, to lessen materially the vulnerability of its position in the final structure in relation to the fluid conducted by the hose.

The hose is then inserted into the chamber of the coupling in end to end abutment with a distortable washer or sealing ring 18, preferably of rubber composition that has previously been positioned against the end wall of the coupling chamber. The washer 18 is preferably formed with an annular lip 19 projecting in an axial direction from the body of the washer at the outer periphery of the latter, which lip provides material for filling the space left by the removed cover material, and the lip is so disposed that it may be effectively compressed in a radial direction against the hose wall at the same time that the washer is crowded against the walls of the coupling and hose by the operation of compressing the coupling sleeve upon the hose.

The operation of compressing the coupling sleeve upon the hose is preferably carried out by means of a swaging die 20, shown in section in Fig. 1, by a relative movement of the die with respect to the coupling from right to left in Fig. 1, starting at or to the right of the zone of the washer 18 and continuing along the coupling sleeve up to a position just short of the mouth end of the sleeve, the portion of the sleeve beyond that position being left uncompressed to form the bell mouth 21. The die is diametrically split to permit assembly and disassembly. This operation may be conveniently effected in an arbor press.

During the die movement, movement of the coupling is resisted preferably by means of a clamping and abutting device which may consist of members 22, 22 formed with an aperture between them of such small size as to permit secure clamping of the hose and having a grooved seating portion 23 adapted to be engaged by the mouth end of the coupling sleeve. The hose is clamped by the device 22 preferably at a position somewhat to the left of the mouth of the coupling so that at the start of the relative movement of the die and clamp toward each other, as indicated by the arrows in Fig. 1, the hose and washer are caused to be forcibly pressed endwise into the coupling chamber to fill the space therein, the relative movement of the clamp and coupling sleeve to their abutting positions permitting this, and as the relative die and clamp movement is continued to reduce the diameter of the sleeve the hose and washer are firmly compressed radially between the walls of the chamber, while these parts are thus held pressed endwise therein, to provide a secure locking engagement with the coupling and an effective seal at the end wall of the chamber.

By the abutment of the clamp and coupling sleeve during the swaging operation elongation of the sleeve is resisted and the distortion of the metal of the sleeve results in greater wall thickness of the sleeve while the diameter of the latter is reduced, thereby contributing to the effective pressing of the sleeve upon the hose wall.

If desired, the coupling sleeve may be reduced to its final shape by successive swaging operations through dies of diminishing size, instead of by a single operation, to minimize the likelihood of injury to the metal.

The swaging down of the coupling sleeve at the zone of the hose end while the hose is positively and forcibly held and pressed axially into the coupling gives a high degree of assurance that there will be no voids or unfilled crevices in the final structure that might result in leakage, and the forcible axial crowding of the hose into the coupling without the likelihood of forcing the end of the hose cover to a vulnerable position of accessibility to the fluid is facilitated by the termination of the hose cover short of the hose end.

In the final structure the fluid is barred from creeping along the coupling wall and reaching the end 17 of the hose covering by the sealing material which is effectively held compressed against the coupling not only over the entire radial extent of the end wall of the chamber but also for a distance axially along the inner face of the sleeve corresponding in extent to the amount of cover removed. Thus, due to the separation of the end of the cover from the fluid by the extensive sealing zone and due to the effective sealing pressure along this zone, the fluid is effectively barred from reaching the end of the cover and leakage by the action of capillarity along the cover is accordingly prevented.

The nipple 14 may be integral with the coupling body as shown in Figs. 1 and 2, or it may be an independent member assembled with the coupling in any suitable manner. The principal function of the nipple is to prevent particles of the body 10 of the hose and the washer 18 from becoming entrained in the fluid by passage into the latter at the end of the hose, although, if desired, the nipple may be utilized also as an auxiliary to the hose liner for resisting inward yielding of the compressed hose wall.

In the modification of Figs. 3 and 4 the construction is the same in Fig. 2 except that the nipple is not integral with the coupling body. In Fig. 4 the nipple 25 is flanged at right angles and is held with its flange pressed in an axial direction against the end wall of the chamber. In Fig. 3 the nipple 26 has a frusto-conical end flange abutting a correspondingly shaped seat 27 in the coupling body. This latter construction has the advantage of a centering action of the tapered surfaces which facilitates the provision of flush inner surfaces of the nipple and coupling body, and this construction, moreover, has the advantage that the pressure of the compressed hose wall and washer both in the axial and in the radial directions is utilized to press the nipple against its seat.

It will be seen that the objects of a high degree of fluid tightness and locking strength of the coupling upon the hose end are attained with economy and simplicity of construction and procedure.

Variations may be made without departing from the scope of the invention as it is defined in the following claims:

We claim:

1. A hose coupling assembly comprising, in combination, a coupling body element, an outer sleeve element and an inner tubular element having between them a hose-wall chamber, a hose having its wall positioned in said chamber, and a distortable sealing ring positioned between the end wall of said chamber and the end surface of the hose, said ring having an annular lip held radially compressed against the material of the hose wall between the outer sleeve and inner tubular elements.

2. A hose coupling assembly as defined in claim 1 in which the sealing ring and its annular lip are of distortable rubber composition.

3. A hose coupling assembly comprising, in combination, a coupling body element, an outer sleeve element and an inner tubular element having between them a hose-wall chamber, a hose having its wall positioned in said chamber, and a distortable rubber sealing ring positioned between the end wall of said chamber and the end surface of the hose, said hose having a fibrous cover terminating short of the end of the hose wall and said ring having an annular lip held radially compressed between the outer sleeve element and the uncovered portion of said hose wall.

4. A hose coupling assembly comprising, in combination, an integral coupling body and outer sleeve element, an inner tubular element, said elements having between them a hose-wall chamber, a hose having its wall in said chamber and having a cover of fibrous material, and a distortable sealing ring positioned between the end wall of said chamber and the end surface of the hose, said ring having an annular lip positioned between the outer sleeve element and the hose wall and said outer sleeve and inner tubular elements being of less radial spacing than the normal thickness of the hose wall and holding the hose and the lip ring compressed therebetween.

5. A hose coupling assembly comprising in combination, an integral coupling body and outer sleeve element, an inner tubular element, said elements having between them a hose-wall chamber, a hose having its wall in said chamber and having a cover of fibrous material terminating short of the hose end, and a distortable sealing ring at said hose end, said outer sleeve and inner tubular elements at the zone of said ring and uncovered portion of the hose wall being of less radial spacing than the normal thickness of the hose wall and holding the ring and hose wall compressed therebetween.

6. A hose coupling assembly comprising, in combination, an integral coupling body and outer sleeve element, an inner tubular element, said elements having between them a hose wall chamber, a hose having its wall held in said chamber, and a distortable sealing ring at the hose end, said coupling body having an annular portion projecting from the end wall at said chamber at the bore of the coupling and presenting a seat facing at least in part radially toward said ring, the end portion of said inner tubular element lying against said seat, and said outer sleeve at the zone of said seat being of smaller inner diameter than the normal outer diameter of the hose and by compression of said ring holding said tubular element pressed against the seat.

7. The method of making a hose coupling assembly which comprises positioning within a coupling chamber defined by an inner tubular element and an integral body and outer tubular element, a hose end in association with an end sealing ring contacting the end surface of the hose and having an annular lip coextensive axially with a portion of the hose wall, and then reducing the radial spacing of said inner and outer tubular elements to compress the intervening material at the zone of said lipped ring by distortion of at least one of the said tubular elements to said zone and then progressively toward the coupling mouth.

8. A method as defined in claim 7 in which the outer tubular element is reduced in diameter by die swaging progressively in the said axial direction.

9. A method as defined in claim 7 in which the outer tubular element is reduced in diameter by die swaging progressively in the said axial direction while simultaneous movement of the die and coupling is resisted by an abutment at the coupling mouth and while the hose is held pressed axially into the coupling chamber.

10. The method of making a hose coupling assembly which comprises pressing a hose end axially within a coupling chamber defined by an inner tubular element and an integral body and outer tubular element, and reducing the diameter of said outer tubular element at the zone of the hose end and progressively toward the mouth of the coupling to compress the hose wall between the walls of said chamber while holding the hose end so pressed within the chamber and while resisting axial movement of the coupling by an abutment at the coupling mouth.

11. The method of making a hose coupling assembly which comprises removing the end margin of the cover of a fabric covered hose, positioning the hose end in association with an end sealing ring within a coupling chamber defined by an inner tubular element and an integral body and outer tubular element, and while holding the hose pressed axially into said coupling chamber reducing the diameter of said outer tubular element at the zone of said sealing ring and progressively toward the mouth of the coupling to compress the hose wall and sealing ring between the walls of said chamber.

12. The method of making a hose coupling which comprises positioning the end of a hose within a coupling chamber defined by a coupling body and inner and outer tubular elements, and reducing the radial spacing of said inner and outer tubular elements to compress the hose wall therebetween by reducing the diameter of the outer tubular element substantially without effecting axial elongation thereof.

13. The method of making a hose coupling which comprises positioning the end of a hose within a coupling chamber defined by a coupling body, an inner tubular element and an outer sleeve, and compressing the sleeve upon the hose by reducing the sleeve in diameter at the said end of the hose and progressively in the direction toward the opposite end of the hose substantially without effecting axial elongation of the sleeve.

14. A method as defined in claim 13 in which the sleeve is reduced in diameter by die swaging in the said axial direction while axial elongation of the sleeve is resisted by an abutment at the mouth end of the sleeve.

15. The method of making a hose coupling which comprises positioning the end of a hose in a coupling chamber defined by a coupling body, an inner tubular element and an outer sleeve, applying a clamp to the hose at a position adjacent to but spaced from the mouth end of the coupling sleeve, and then compressing the sleeve upon the hose wall by die swaging the sleeve in the direction toward said clamp, thereby causing the clamped hose to be pressed axially into the coupling and the mouth end of the coupling sleeve to be abutted by the clamp during the swaging operation.

CHARLES C. CADDEN.
HARRY A. BOURNE.